United States Patent
Porat et al.

(10) Patent No.: US 9,906,964 B2
(45) Date of Patent: Feb. 27, 2018

(54) HIERARCHICAL TRANSMISSION IN WIRELESS COMMUNICATIONS

(71) Applicant: BROADCOM CORPORATION, Irvine, CA (US)

(72) Inventors: Ron Porat, San Diego, CA (US); Nihar Jindal, San Francisco, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 182 days.

(21) Appl. No.: 14/510,510

(22) Filed: Oct. 9, 2014

(65) Prior Publication Data

US 2015/0098423 A1   Apr. 9, 2015

Related U.S. Application Data

(60) Provisional application No. 61/888,813, filed on Oct. 9, 2013.

(51) Int. Cl.
| | | |
|---|---|---|
| *H04W 24/02* | (2009.01) | |
| *H04L 5/00* | (2006.01) | |
| *H04L 27/34* | (2006.01) | |

(52) U.S. Cl.
CPC ............. *H04W 24/02* (2013.01); *H04L 5/00* (2013.01); *H04L 27/3488* (2013.01); *H04L 5/0037* (2013.01); *H04L 5/0046* (2013.01)

(58) Field of Classification Search
CPC .......................... H04W 24/02; H04W 72/082
See application file for complete search history.

(56) References Cited

U.S. PATENT DOCUMENTS

| | | | |
|---|---|---|---|
| 2012/0155415 A1* | 6/2012 | Seok | H04L 1/0003 370/329 |
| 2012/0300691 A1* | 11/2012 | Chao | H04L 5/0044 370/312 |
| 2013/0084815 A1* | 4/2013 | Stirling-Gallacher | H04B 7/0617 455/101 |
| 2013/0294503 A1* | 11/2013 | Gordon | H04N 21/23432 375/240.02 |

* cited by examiner

*Primary Examiner* — Rhonda Murphy
(74) *Attorney, Agent, or Firm* — Garlick & Markison; Shayne X. Short

(57) ABSTRACT

A wireless communication device includes a communication interface and a processor that operate to generate a first transmission stream by processing first information based on first parameter(s) and a second transmission stream by processing second information based on second parameter(s). In some examples, the second at least one parameter is relatively less robust than the first at least one parameter, and the second information augments the first information when combined with the first information. The wireless communication device then transmits the first transmission stream and the second transmission stream to at least one other wireless communication device. Examples of such parameters include forward error correction (FEC) code, error correction code (ECC), modulation coding set (MCS), modulation type including a mapping of constellation points arranged in a constellation, power (e.g., transmit (TX) power), orthogonal frequency division multiplexing (OFDM) configuration, and/or a multiple-input-multiple-output (MIMO) configuration.

20 Claims, 9 Drawing Sheets

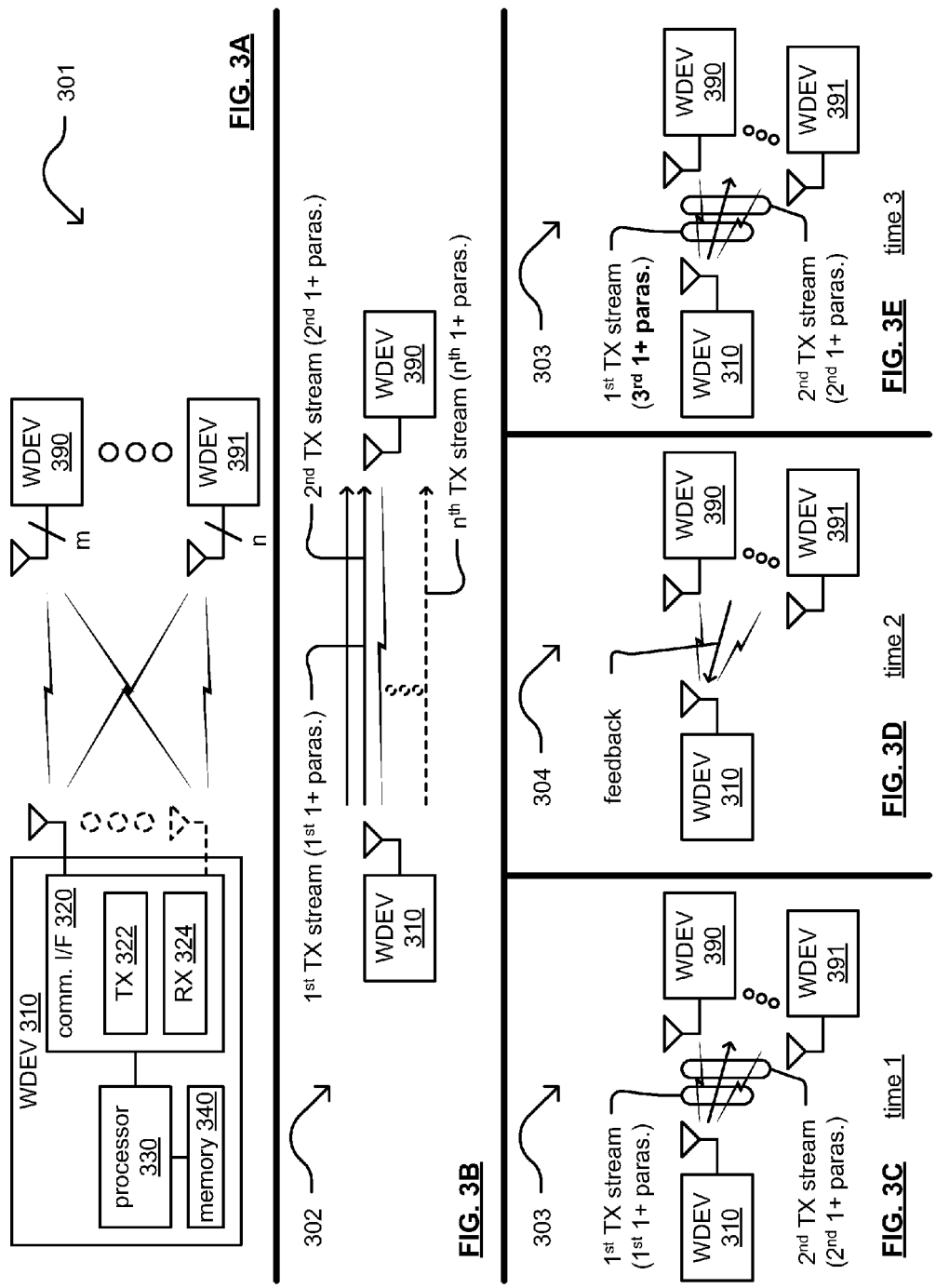

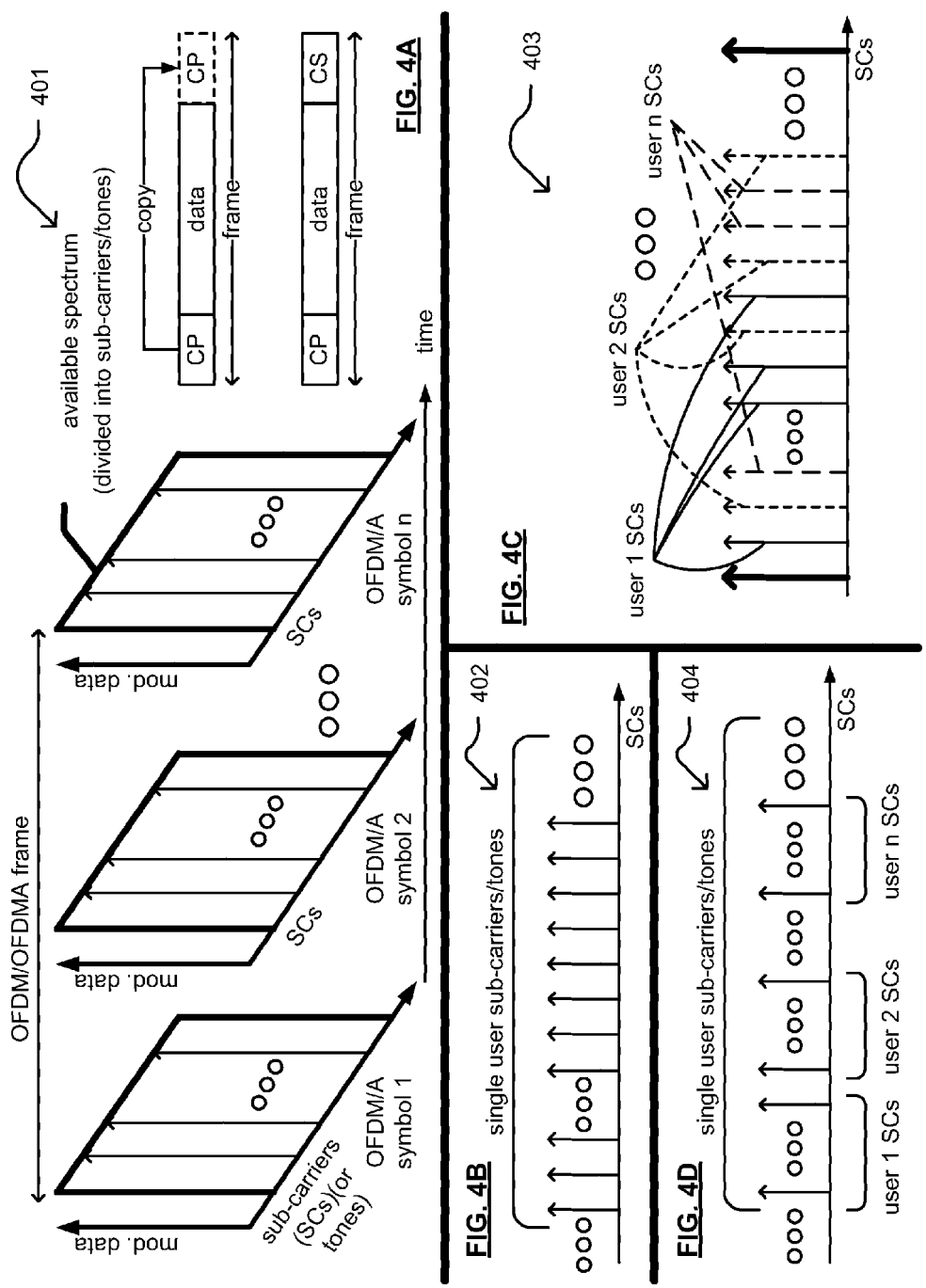

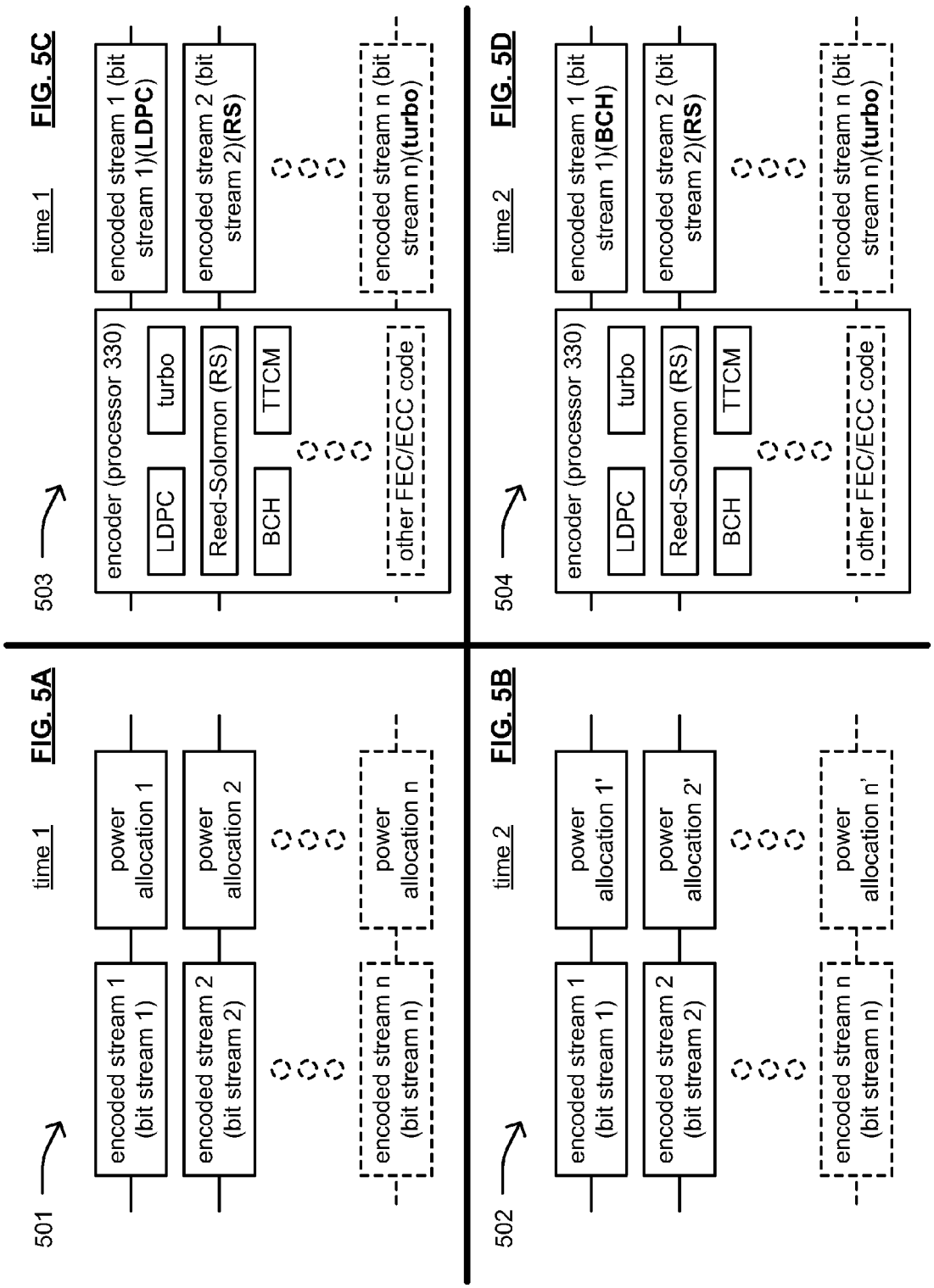

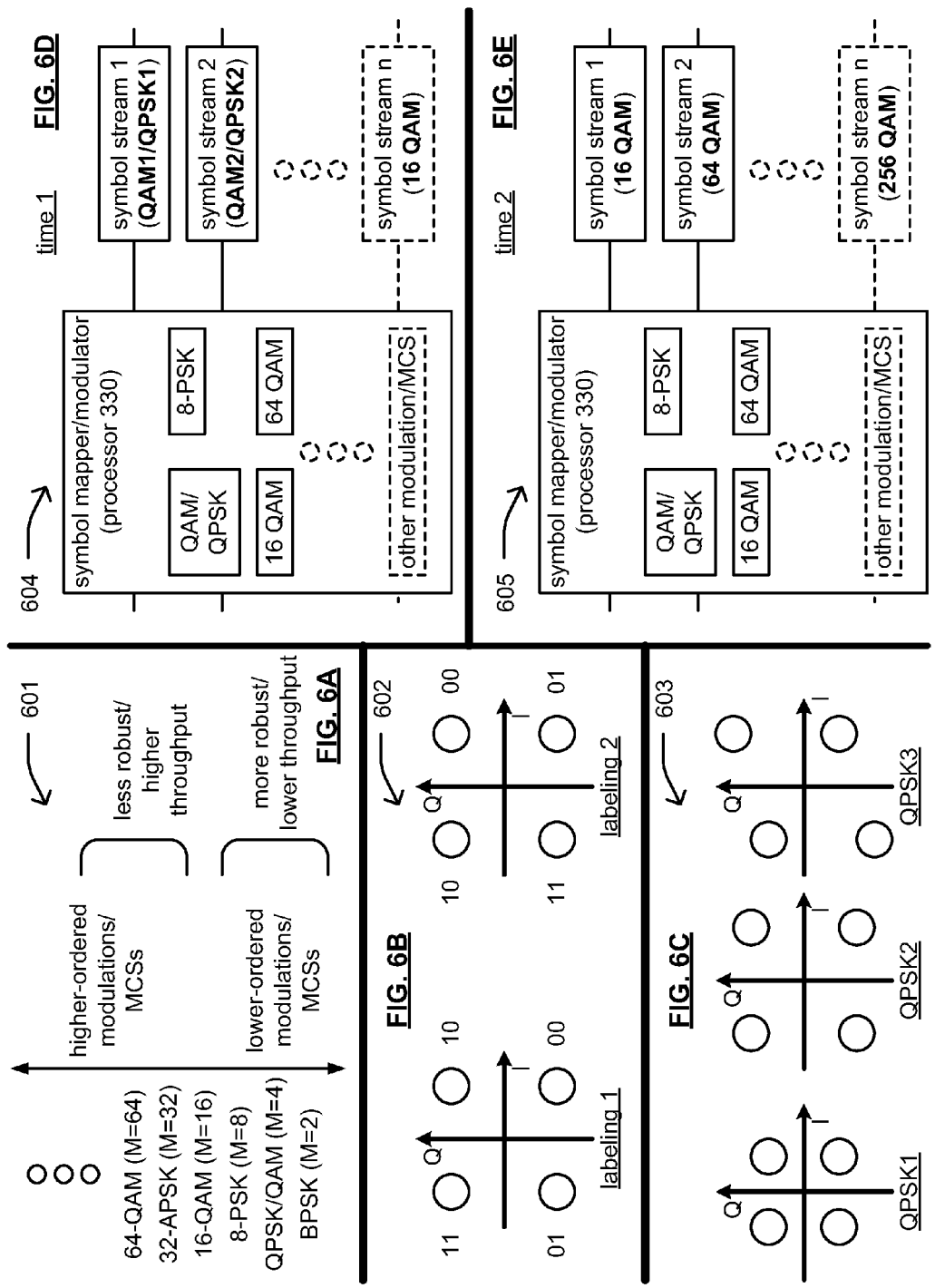

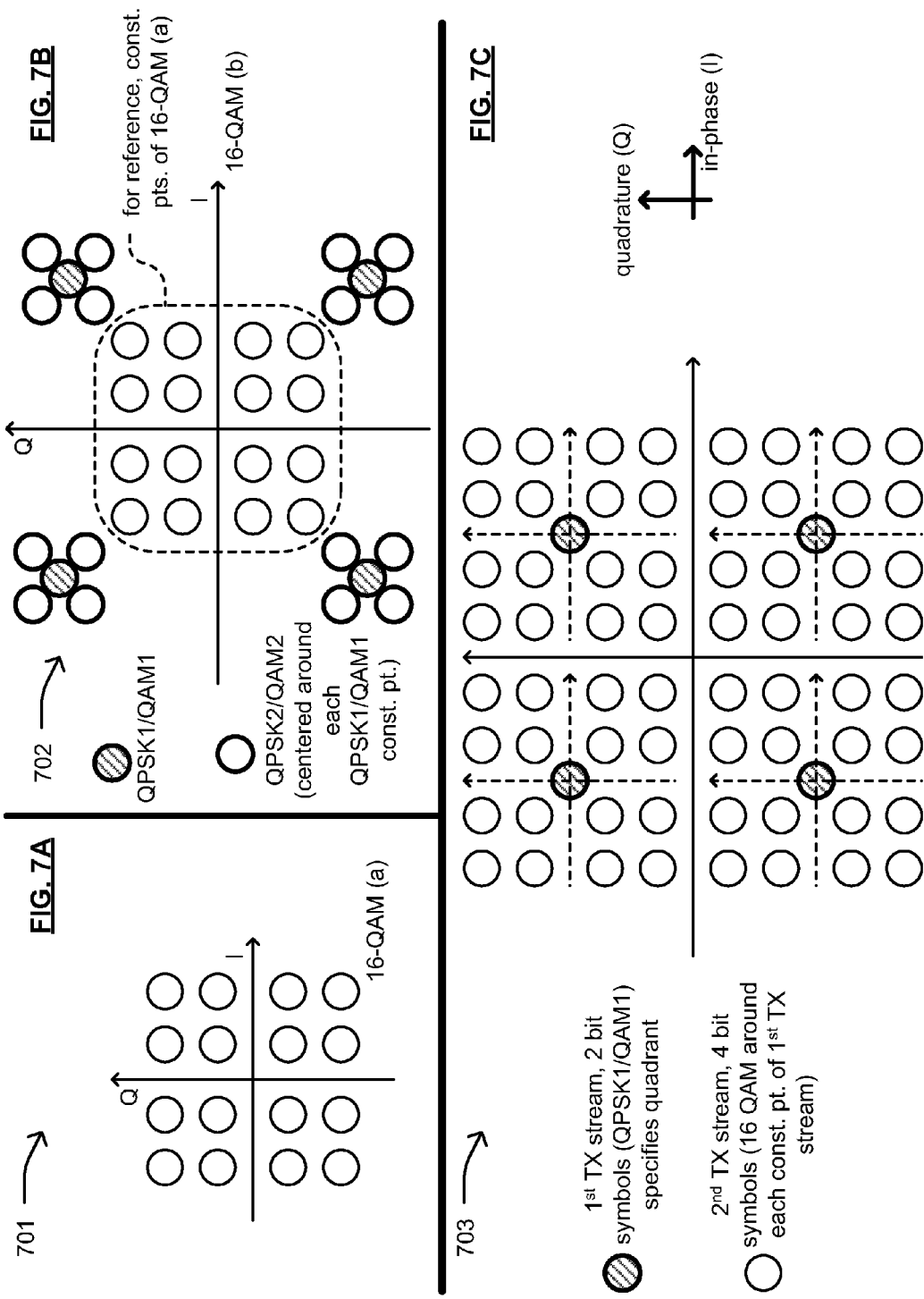

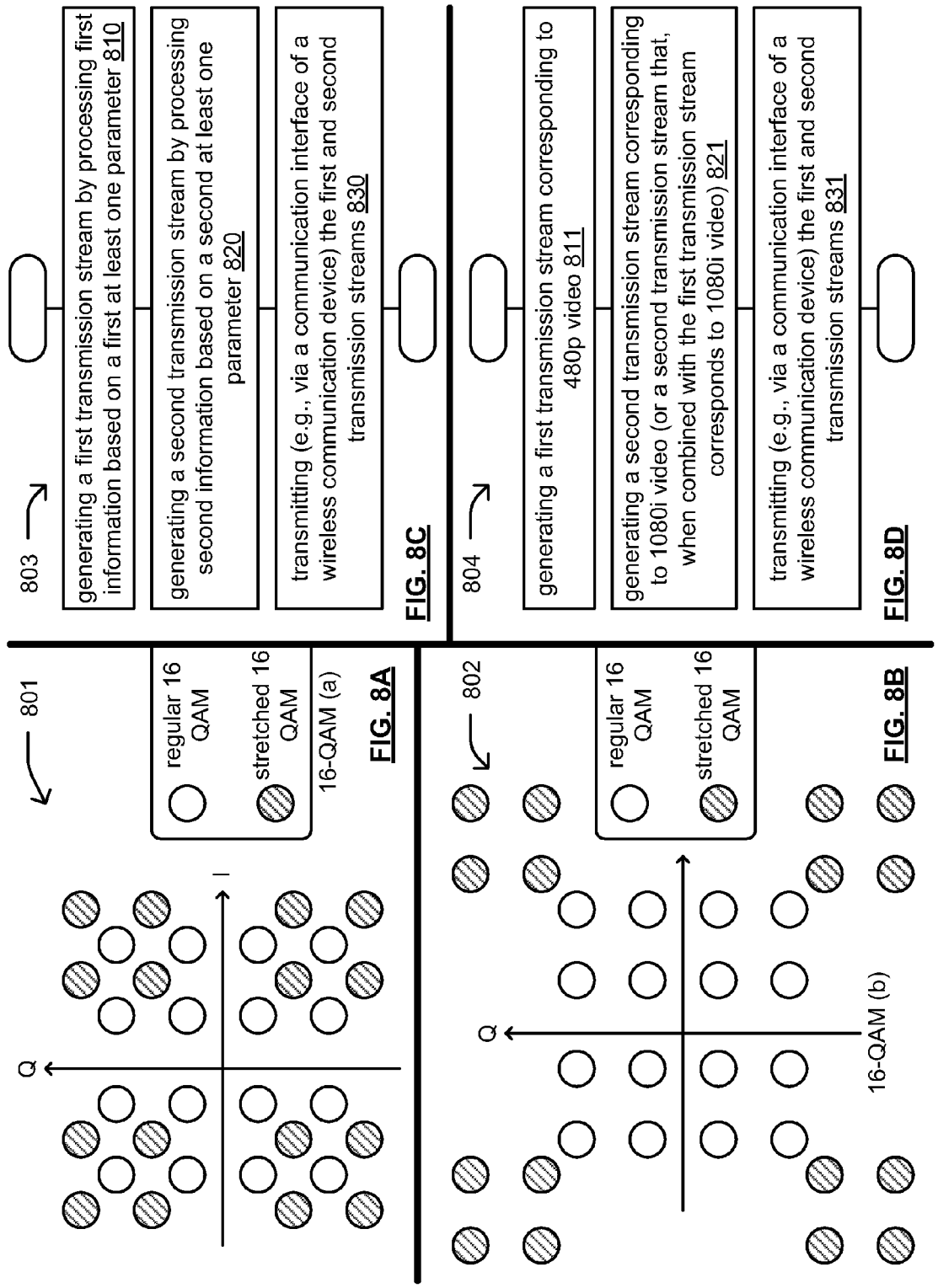

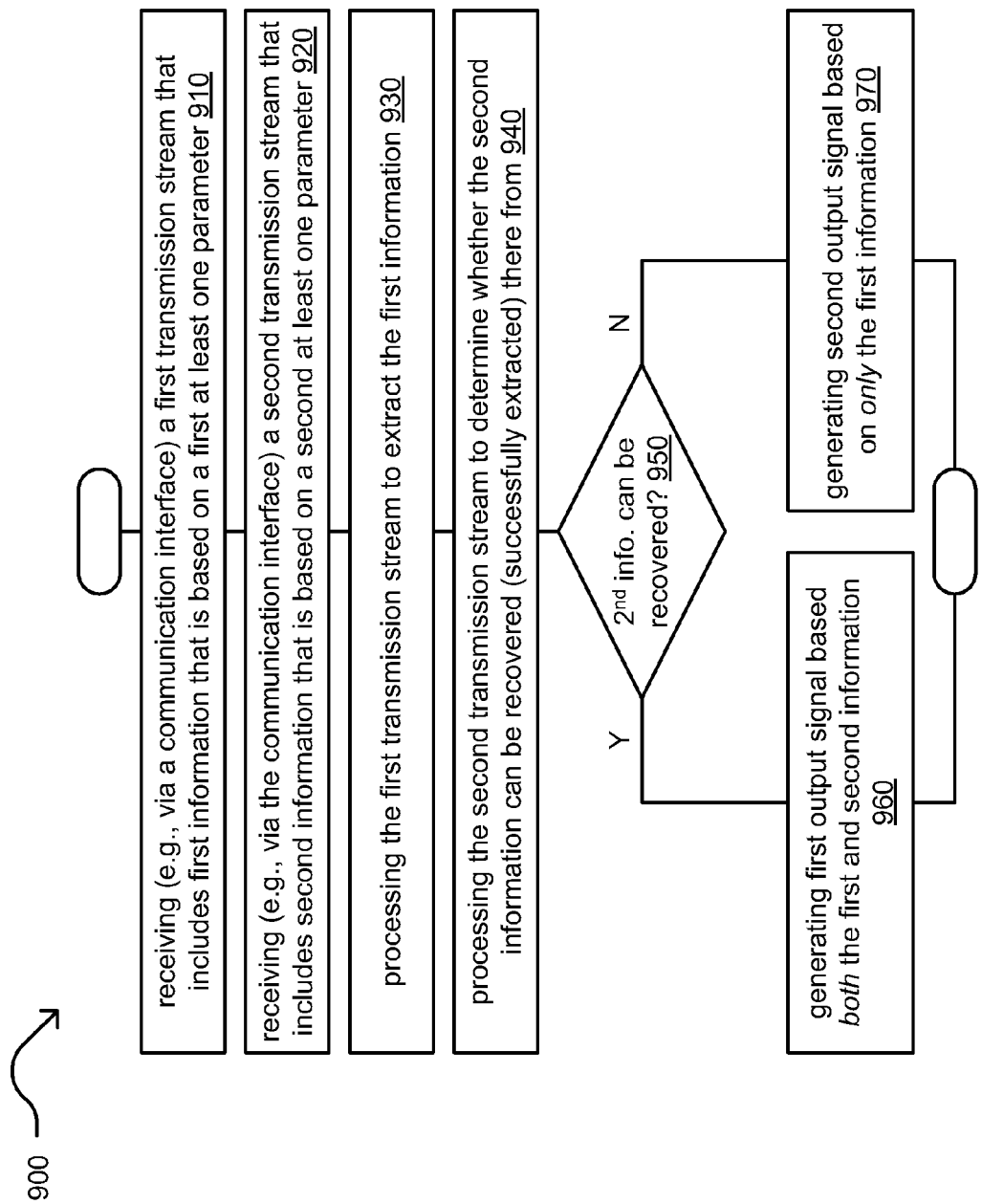

HIERARCHICAL TRANSMISSION IN WIRELESS COMMUNICATIONS

CROSS REFERENCE TO RELATED PATENTS/PATENT APPLICATIONS

Provisional Priority Claim

The present U.S. Utility Patent Application claims priority pursuant to 35 U.S.C. § 119(e) to U.S. Provisional Application No. 61/888,813, entitled "Hierarchical transmission in wireless communications," filed Oct. 9, 2013, which is hereby incorporated herein by reference in its entirety and made part of the present U.S. Utility Patent Application for all purposes.

BACKGROUND

Technical Field

The present disclosure relates generally to communication systems; and, more particularly, to hierarchical transmission and reception of communications within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Some communication systems suffer deleteriously from interference, noise, etc. There may be instances in which a first device is able to communicate at a first signal to noise ratio (SNR) while a second device is able to communicate only at a second SNR that is different than the first SNR. Typically, communications for both the first and second devices is been tailored to the lower SNR among the first and second SNRs. As such, the device that is able to communicate at the relatively higher SNR is forced to communicate at the relatively lower SNR of the other device. The prior art does not provide an adequate solution to address these and other deficiencies.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 3D is a diagram illustrating another example of communication between wireless communication devices.

FIG. 3E is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 5A is a diagram illustrating an example of power allocation among different bit streams (e.g., encoded bit streams).

FIG. 5B is a diagram illustrating another example of power allocation among different bit streams (e.g., encoded bit streams).

FIG. 5C is a diagram illustrating an example of adaptive encoding for different transmission streams.

FIG. 5D is a diagram illustrating another example of adaptive encoding for different transmission streams.

FIG. 6A is a diagram illustrating an example of different types of modulations or modulation coding sets (MCSs) used for modulation of different bit or symbol streams.

FIG. 6B is a diagram illustrating an example of different labeling of constellation points in a constellation.

FIG. 6C is a diagram illustrating an example of different arrangements of constellation points in a type of constellation.

FIG. 6D is a diagram illustrating an example of adaptive symbol mapping/modulation for different transmission streams.

FIG. 6E is a diagram illustrating an example of adaptive symbol mapping/modulation for different transmission streams.

FIG. 7A is a diagram illustrating an example of constellation point distribution of a constellation points in a constellation (e.g., with different power allocations).

FIG. 7B is a diagram illustrating another example of constellation point distribution of a constellation points in a constellation (e.g., with different power allocations).

FIG. 7C is a diagram illustrating an example of different transmission streams associated with different modulations.

FIG. 8A is a diagram illustrating another example of different transmission streams associated with different modulations.

FIG. 8B is a diagram illustrating another example of different transmission streams associated with different modulations.

FIG. 8C is a diagram illustrating an embodiment of a method for execution by one or more wireless communication devices.

FIG. 8D is a diagram illustrating another embodiment of a method for execution by one or more wireless communication devices.

FIG. 9 is a diagram illustrating another embodiment of a method for execution by one or more wireless communication devices.

DETAILED DESCRIPTION

Figure 1:
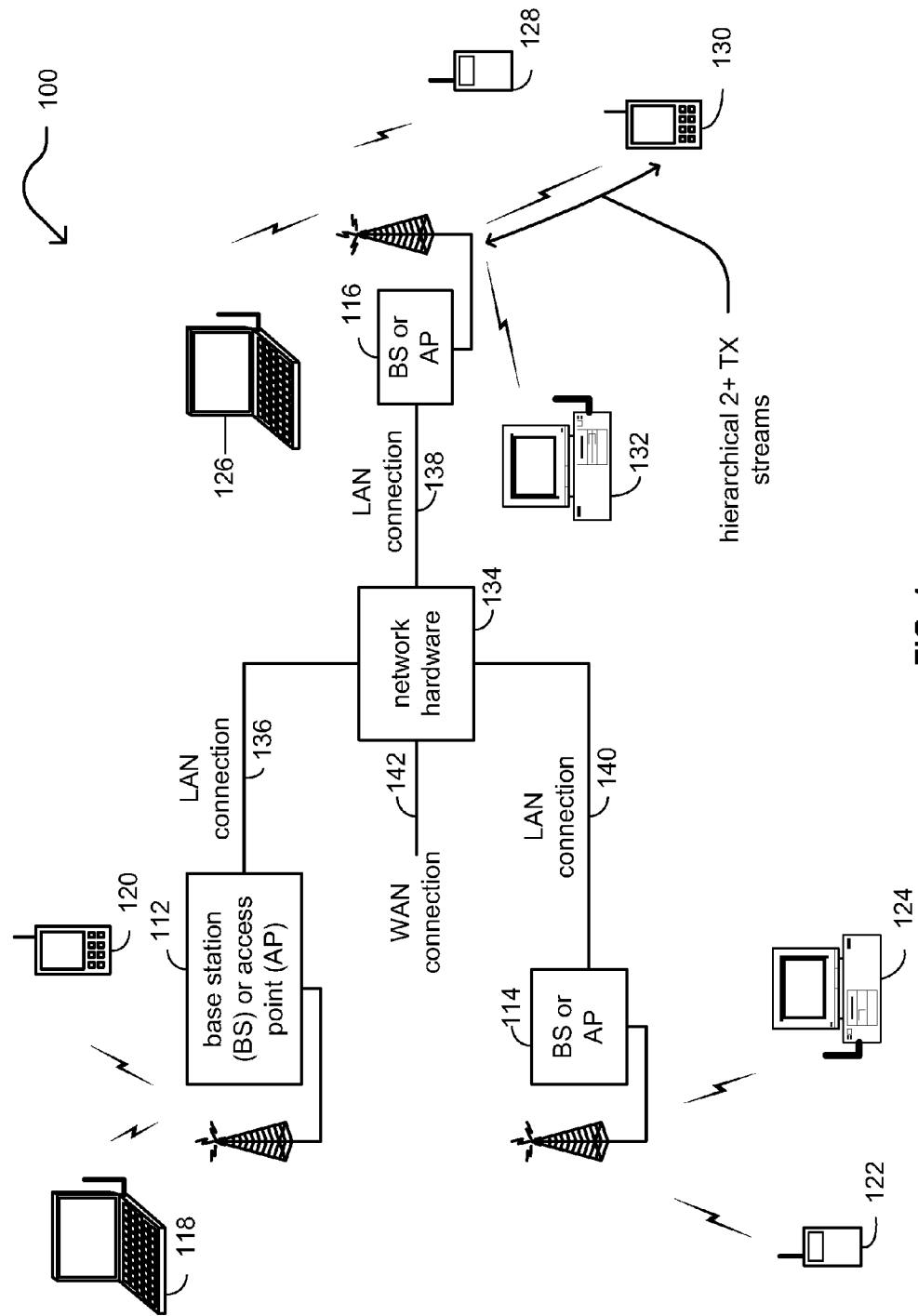
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391).

The processor of any one of the various devices, WDEVs 118-132 and BSs or APs 112-116, may be configured to support communications via at least one communication interface with any other of the various devices, WDEVs 118-132 and BSs or APs 112-116. Such communications may be uni-directional or bi-directional between devices. Also, such communications may be uni-directional between devices at one time and bi-directional between those devices at another time.

In an example of operation, one of the devices, such as device 130, includes a communication interface and a processor that cooperatively operate to support communications with another device, such as device 116, among others within the system. The processor is operative to generate and interpret different signals, frames, packets, symbols, etc. for transmission to other devices and that have been received from other devices. Considering one particular type of transmission between devices, the device 130 generates an orthogonal frequency division multiplexing (OFDM) symbol (or a packet or frame that includes one or more OFDM symbols). The device 130 generates two or more transmission streams based on different information and different parameters. In one specific example, the device 130 generates a first transmission stream by processing first information based on a first at least one parameter and a second transmission stream by processing second information based on a second at least one parameter. The second at least one parameter is different than the first at least one parameter and can be relatively more or less robust than the first at least one parameter. In some instances, the second transmission stream includes entirely different information than and is unrelated to the first transmission stream. However, in other instances, the second transmission stream includes information that, when combined with the first information within the first transmission stream, modifies the first information. For example, the second transmission stream can include second information to augment the first information within the first transmission stream.

In another example of operation, device 130 receives a first transmission stream and a second transmission stream from device 116. The device 130 processes the first transmission stream to extract first information there from. The device 130 processes the second transmission stream to determine whether or not second information may be successfully extracted from the second transmission stream. For example, the first transmission stream may be transmitted from device 116 with sufficient robustness in a noisy environment such that it is successfully received and can be successfully processed by device 130, but the second transmission stream may be transmitted from device 116 with relatively less robustness in the noisy environment such that it cannot be successfully received or processed by device 130. Depending on the determination of whether or not the second information from the second transmission stream may be recovered successfully, the device 130 generates an output signal based on either the first information only that is extracted from the first transmission stream (e.g., when the second information within the second transmission stream cannot be successfully recovered) or both the first information and the second information that are extracted from the first and second transmission streams (e.g., when the second information within the second transmission stream can be successfully recovered). In certain examples, the first transmission stream is transmitted with sufficiently robust parameters that it can be received and processed by device 130 even in a relatively very noisy environment. As such, an assumption can be made that the first transmission stream will be successfully received and processed by device 130. However, the second transmission stream may not always be successfully received and processed by device 130 (e.g., depending on the noise, interference, signal to noise ratio (SNR), signal to interference noise ratio (SINR), etc.) of a communication pathway between devices 116 and 130.

In an example in which the second information is successfully recovered and the second information is wholly independent from the first information, the device 130 recovers both the first information and the second information and may use them for different purposes. In another example in which the second information is successfully recovered and the second information is related to or tied to the first information, the device 130 recovers both the first information and the second information and utilizes them together for a given purpose.

In examples with one or more additional transmission streams, if any of the one or more additional transmission streams can be received and information recovered there from, then any information recovered from the one or more additional transmission streams may also be used in conjunction with information recovered from the first, second, and/or other one or more additional transmission streams. For example, a first device (e.g., device 130) may be able only to recover information from a first transmission stream, a second device (e.g., device 128) may be able to recover information from both the first transmission stream and a second transmission stream, and a third device (e.g., device 132) may be able to recover information from both the first and second transmission streams and a third transmission stream. As such, the first device (e.g., device 130) can generate a first output signal based on information from the first transmission stream, the second device (e.g., device 128) can generate a second output signal based on information from both the first and second transmission streams, and the third device (e.g., device 132) can generate a third output signal based on information from all of the first, second, and third second transmission streams. In a video signaling example, the first output signal may be 480i resolution video, the second output signal may be 720i resolution video, and the third output signal may be 1080i resolution video (e.g., such that output signals of greater or improved quality can be generated when information can be recovered from additional transmission stream(s)).

Figure 2:
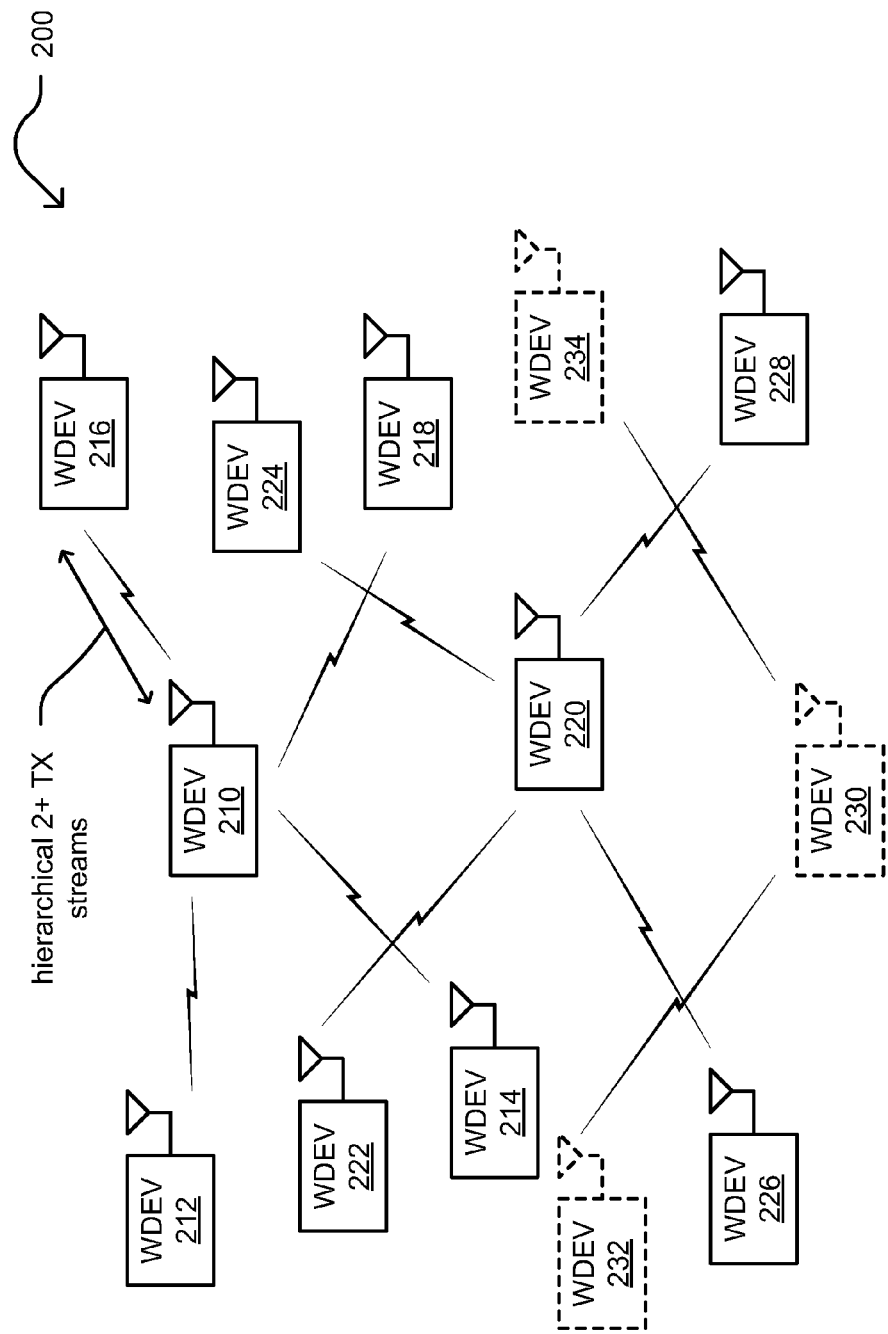
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain WDEVs of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation, devices 210 and 216 communicate with one another. The device 210 includes a communication interface and a processor that cooperatively operate to support communications with another device, such as device 216, among others within the system. The processor is operative to generate and interpret different signals, frames, packets, symbols, etc. for transmission to other devices and that have been received from other devices. Considering one particular type of transmission between devices, the device 210 generates an OFDM packet that includes one or more OFDM symbols. The device 210 generates two or more transmission streams by processing different information based on different parameters and transmits the two or more transmission streams to device 216. In this embodiment 200, there may be rapidly changing or varying noise, interference, SNRs, etc. of the various communication links between the devices. The device 210 generates and transmits the two or more transmission streams based on different parameters such that a first at least one of the transmission streams is transmitted in such a way of (e.g., using one or more parameters that are relatively robust) that most or all of the other devices in the system are able to receive, demodulate, and successfully recover information there from. The device 210 generates a second at least one transmission stream with at least one different parameter than the first at least one of the transmission stream (e.g., using one or more parameters that are relatively less robust, provide for greater throughput, greater information carrying capacity, etc.). A device, such as device 216, should always or almost always be able to recover information from the first at least one transmission stream successfully. However, there may be times in which device 216 cannot recover information from the second at least one transmission stream successfully. The device 210 generates an output signal based on either only the information that is extracted from the first at least one transmission stream (e.g., when information from the second at least one transmission stream cannot be successfully recovered) or information extracted from both the first and second at least one transmission streams.

In certain examples, the first at least one transmission stream is transmitted with sufficiently robust parameters that it can be received and processed by device 210 even in a relatively very noisy environment. As such, an assumption can be made that the first transmission stream will be successfully received and processed by device 210. However, the second transmission stream may not always be successfully received and processed by device 210 (e.g., depending on the noise, interference, signal to noise ratio (SNR), signal to interference noise ratio (SINR), etc.) of a communication pathway between devices 210 and 216.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably). The wireless communication device 310 also includes a processor 330, and an associated memory 340, to execute various operations including interpreting at least one packet or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include more than one antenna for transmitting and receiving of at least one packet or frame (e.g., WDEV 390 may include m antennae, and WDEV 391 may include n antennae).

FIG. 3B is a diagram illustrating another example 302 of communication between wireless communication devices. In an example of operation, the processor 330 of device 310 generates and interprets different signals, frames, packets, symbols, etc. for transmission to other devices and that have been received, via communication interface 320, from other devices (e.g., device 390). Considering one particular type of transmission between devices, the processor 330 of device 310 generates an orthogonal frequency division multiplexing (OFDM) symbol (or a packet or frame that includes one or more OFDM symbols). The processor 330 generates two or more transmission streams based on different information and different parameters. In one specific example, the processor 330 generates a first transmission stream by processing first information based on a first at least one parameter and a second transmission stream by processing second information based on a second at least one parameter. The second at least one parameter is different than the first at least one parameter and can be relatively more or less robust than the first at least one parameter. In some instances, the second transmission stream includes entirely different information than and is unrelated to the first transmission stream. However, in other instances, the second transmission stream includes information that, when combined with the first information within the first transmission stream, modifies the first information. For example, the second transmission stream can include second information to augment the first information within the first transmission stream.

In another example of operation, processor 330 receives a first transmission stream and a second transmission stream from processor 390. The processor 330 processes the first transmission stream to extract first information there from. The processor 330 processes the second transmission stream to determine whether or not second information may be successfully extracted from the second transmission stream. For example, the first transmission stream may be transmitted from processor 390 with sufficient robustness in a noisy environment such that it is successfully received and can be successfully processed by processor 330, but the second transmission stream may be transmitted from processor 390 with relatively less robustness in the noisy environment such that it cannot be successfully received or processed by processor 330. Depending on the determination of whether or not the second information from the second transmission stream may be recovered successfully, the processor 330 generates an output signal based on either the first information only that is extracted from the first transmission stream (e.g., when the second information within the second transmission stream cannot be successfully recovered) or both the first information and the second information that are extracted from the first and second transmission streams (e.g., when the second information within the second transmission stream can be successfully recovered). In certain examples, the first transmission stream is transmitted with sufficiently robust parameters that it can be received and processed by processor 330 even in a relatively very noisy environment. As such, an assumption can be made that the first transmission stream will be successfully received and processed by processor 330. However, the second transmission stream may not always be successfully received and processed by processor 330 (e.g., depending on the noise, interference, signal to noise ratio (SNR), signal to interference noise ratio (SINR), etc.) of a communication pathway between devices 310 and 390.

Some examples of some parameters used to generate transmission streams include forward error correction (FEC) code, error correction code (ECC), modulation coding set (MCS), modulation type including a mapping of constellation points arranged in a constellation, power (e.g., transmit (TX) power), orthogonal frequency division multiplexing (OFDM) configuration, and/or a multiple-input-multiple-output (MIMO) configuration. The first and second transmission streams may vary by as few as one parameter or as many as all parameters. For example, the first transmission stream may be based on any one or more of a first FEC code, a first ECC, a first MCS, a first modulation type including a first mapping of first constellation points arranged in a first constellation, a first power, first OFDM configuration, and the second transmission stream may be based on any one or more of a second FEC code, a second ECC, a second MCS, a second modulation type including a second mapping of second constellation points arranged in a second constellation, a second power, second OFDM configuration, and/or second MIMO configuration.

Examples of FEC codes or ECCs may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), etc. Examples of MCSs may include any of a variety of different combinations of modulation, symbol mapping, etc. such as within various communication protocols, standards, and/or recommended practices (e.g., MCS0, MCS1, etc.). Examples of modulation types may include constellations of a particular type or shape quadrature phase shift keying (QPSK), 16 QAM, M-QAM (e.g., where M=64, 256, etc.) etc. among other types of modulation, and may specify particular constellation point labeling within those constellations. Examples of powers, such as transmission powers, can include a first transmission power, second transmission power, etc. Examples of OFDM configurations can include identification of one or more frequency bands, one or more channels within the one or more frequency bands, number of sub-carriers, spacing between such sub-carriers, any OFDM framing, number of symbols within such OFDM framing, and/or any other related characteristic dealing with OFDM.

Examples of MIMO configurations may include specifying which antenna are to transmit certain transmission streams, a number of streams, a number of space time streams, a type of beamforming performed by the antennas, transmit powers of the antennas, antenna weight vectors (AWVs), etc. and/or any other related characteristic dealing with MIMO configuration.

The processor 330 may generate the second transmission stream using certain parameters relative to the first transmission stream that are relatively less robust yet provide for a greater throughput of information. For example, when generating the second transmission stream relative to the first transmission stream, the processor 330 uses a second FEC code that is relatively less robust and has relatively higher code rate than the first FEC of the first transmission stream or a second ECC that is relatively less robust and has relatively higher code rate than the first ECC of the first transmission stream. In another example, when generating the second transmission stream, the processor 330 uses a second MCS that is relatively less robust and provides for relatively higher throughput than the first MCS of the first transmission stream. In another example, when generating the second transmission stream, the processor 330 generates symbols based on a modulation having relatively more constellation points than used for the first transmission stream and symbols within the second transmission stream include relatively more bits per symbol than the symbols within the first transmission stream. In another example, when transmitting the second transmission stream, the processor 330 transmits, via the communication interface 320, the second transmission stream with relatively lower power than the first transmission stream. In such an example, the processor 330 transmits, via the communication interface 320, the first transmission stream at a relatively higher power to provide for a greater probability that the first transmission stream will be successfully received by the recipient device, such as device 390.

In some examples, the operations shown within FIG. 3C, FIG. 3D, FIG. 3E can be viewed as being performed at or during three successive periods of time (e.g., FIG. 3C at or during a first time, FIG. 3D at or during a second time, and FIG. 3 at or during a third time).

FIG. 3C is a diagram illustrating another example 303 of communication between wireless communication devices. In this diagram, the device 310 generates and transmits a first transmission stream and a second transmission stream to one or more other devices 390-391. The first transmission stream is generated by processing first information based on a first at least one parameter, and the second transmission stream is generated by processing second information based on a second at least one parameter. The first and second transmission streams may be wholly independent from one another or related such that second information within the second transmission stream modifies or augments the first information within the first transmission stream. In certain examples, device 310 generates and transmits the first transmission stream using the first at least one parameter that is selected to ensure that all of devices 390-391 will be able successfully to recover the first information therein (e.g., first at least one parameter selected based on at least one characteristic of a first communication pathway such as noise, interference, SNR, SINR, etc.), and the device 310 generates and transmits a second transmission stream using the second at least one parameter that is selected based on a relatively lower robustness and higher throughput and such that at least one, though perhaps not all in some instances, of the devices 390 through 391 will be able successfully recovered the second information therein (e.g., second at least one parameter selected based on at least one characteristic of a second communication pathway such as noise, interference, SNR, SINR, etc.).

FIG. 3D is a diagram illustrating another example 304 of communication between wireless communication devices. In this diagram, one or both of devices 390-391 provides feedback information to device 310. This feedback information may be related to channel estimation, channel characterization, noise estimation, interference estimation, inter-symbol interference (ISI), signal to noise ratio (SNR), signal to interference noise ratio (SINR), and/or any other feedback information including characterization of the communication pathway between the device providing the feedback information and device 310. For example, device 390 may provide first feedback information to device 310 relating to the communication pathway between devices 390 and 310, and device therein anyone may provide second feedback information to device 310 relating to the communication pathway between devices 390 and 310.

FIG. 3E is a diagram illustrating another example 305 of communication between wireless communication devices. In this diagram, relative to the diagram of FIG. 3C, the device 310 generates and transmits a first transmission stream and a second transmission stream to one or more other devices 390-391 but using at least one different parameter than is used in FIG. 3C. For example, based on feedback information received from one or both of devices 390-391, device 310 can modify at least one parameter used to generate one or both of the first and second transmission streams. Generally speaking, different transmission streams may be adapted and changed over time based on information related to local and/or remote operating conditions relative to device 310, local and/or remote operating conditions relative to devices 390-391, etc. Note that device 310 can generate the first and second transmission streams based on any of a variety of different signaling schemes (e.g., orthogonal frequency division multiplexing (OFDM), orthogonal frequency division multiple access (OFDMA), multi-user multiple-input-multiple-output (MU-MIMO), single-user multiple-input-multiple-output (SU-MIMO), etc.). In one example, device 310 employs OFDM signaling. Some information regarding OFDM and/or OFDMA is provided below.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC)

code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

Generally, a communication device may be configured to include a processor configured to process received OFDM or OFDMA symbols and/or frames and to generate such OFDM or OFDMA symbols and/or frames. Note that general reference to OFDM herein, such as with respect to an OFDM packet, may be adapted to include OFDM or OFDMA. The processor of any communication device described herein may be implemented to generate an OFDM packet based on any of the examples, embodiments, or variants described herein. That communication device may then be implemented to transmit such an OFDM packet to another communication device.

This disclosure presents hierarchical transmission mechanisms for wireless communications that enable at least a portion of the information carried in a packet to be received successfully with higher probability than others. In comparison to prior art approaches, current transmission modes based on prior IEEE 802.11 standards, protocols, and/or recommended practices operates based on an all or nothing approach (e.g., a transmission is either received successfully or not, and a re-transmission of the entire packet must occur when not received successfully).

This disclosure also presents approaches to improve performance of wireless communications when high levels or fluctuation of overlapping basic services set (OBSS) interference occurs. In this case, changes in the predicted signal to interference noise ratio (SINR) occur even mid-packet and make it harder for the link adaptation to converge to the right modulation coding set (MCS) or number of spatial streams (e.g., in next generation type IEEE 802.11 systems such as described with reference to FIG. 3). In such an environment, a wireless communication device (e.g., receiver) can employ techniques to be able to decode a portion of the information if the SINR drops lower (e.g., than some threshold) and the full information if SINR is high are very useful.

However, note that a penalty or reduction of performance may be incurred since the SINR required to decode the full information is higher than the SINR required under normal currently used transmissions in existing IEEE 802.11 standards, protocols, and/or recommended practices. A wireless communication device may be configured to choose the transmission parameters carefully depending on feedback signal over a period of time for a given communication link (e.g., from a receiver wireless communication device) as each communication link may experience different levels of interference with different fluctuation over time.

Multi-layered transmission splits the information (e.g., which can be encoded information, uncoded information, and/or any combination thereof) into 2 or more bit streams where the first stream is mapped to the more robust layer (e.g., requiring lower SINR to decode) and the second stream is mapped to the less robust layer (e.g., requiring higher SINR to decode).

Two techniques are described below as follows:

1. Use of 2 or more encoded streams superposed over each other with different power allocation (e.g. the second stream can be 10 dB weaker to enable robust decoding of the first stream which is designed to work at SINR<10 dB). Users first decode the more robust stream. Users with high SINR can decode the second stream by subtracting the first. The power allocation ratio is a system tradeoff that is determined based on the expected signal coverage—lowest signal to noise ratio (SNR) expected to highest SNR expected such that all users can decode the baseline layer and a high percentage of users can decode the second layer and is signaled in the SIG field (e.g. 4 bits denoting a certain range from 3 dB to 15 dB). Note that usage of multiple streams can be used in conjunction with one or more antennas at the transmit and receive side (e.g., such as using wireless communication devices 410 and 490 with any desired numbers of antennas).

2. Use of stretched modulation symbols (e.g., QAM symbols) where each quadrant constellation point is shifted away from the origin (0,0) point. A user with lower SNR only decodes the correct quadrant (the 2 most reliable bits of the QAM symbol) that provides a portion of the information. A user with higher SNR can decode all QAM points. Similarly to the previous method the stretching level is determined by the system depending on the SNR expected. Note also that any desired type of modulation or modulations may be used and be scaled accordingly (e.g., 4-QAM/QPSK, 8-phase shift keying (PSK), 32 amplitude and phase shift keying (APSK), 64-QAM, 128-QAM, 256-QAM, etc. and/or even higher ordered modulations including larger numbers of constellation points).

FIG. 5A is a diagram illustrating an example 501 of power allocation among different bit streams (e.g., encoded bit streams). At least two different bit streams (e.g., encoded streams) are mapped to different layers (e.g., having one or more different operational parameters). The multi-layered transmission splits the information (e.g., which can be encoded information, uncoded information, and/or any combination thereof) into 2 or more bit streams where the first stream is mapped to the more robust layer (e.g., requiring lower SINR to decode) and the second stream is mapped to the less robust layer (e.g., requiring higher SINR to decode). In some embodiments, there can be additional streams (e.g., up to n). In FIG. 5A, a first stream is mapped to a first layer having a first power allocation, and a second stream is mapped to a second layer having a second power allocation. In some embodiments, another stream n is mapped to another layer n having an n-th power allocation.

FIG. 5B is a diagram illustrating another example 502 of power allocation among different bit streams (e.g., encoded bit streams). The respective streams (e.g., 1, 2, and so on up to n) are mapped differently than in FIG. 5A. In FIG. 5B, the first stream is mapped to a first layer having a first modified power allocation (e.g., different than the first power allocation), and a second stream is mapped to a second layer having a second modified power allocation (e.g., different than the second power allocation). In some embodiments, another stream n is mapped to another layer n having an n-th modified power allocation (e.g., different than the n-th power allocation). A wireless communication device may be configured to perform adaptive power allocation among 2 or more streams at different times based on any desired considerations.

Multi-Layer Transmission (e.g., for Video Applications)

Multi-layered transmission can be used to provide higher throughput to devices with better link (e.g., with communication pathways with higher SNR or SINR, lower noise, lower interference, etc. or generally a communication link that allows for communications based on relatively less robust and/or higher throughput parameters). These techniques are usually coupled with splitting the video transmission to 2 or more bit streams where the first stream provides a baseline video quality and is mapped to the more robust layer and the second stream provides higher resolution video quality (e.g., 15 frames per second (fps) vs. 30 or 60 fps) or standard definition television (SDTV) resolution vs. high definition television (HDTV) vs. 8K HDTV resolution) and is mapped to the less robust layer.

Two techniques are described as follows:

1. Use of 2 or more encoded streams superposed over each other with different power allocation (e.g., the second stream can be 10 dB weaker to enable robust decoding of the first stream which is designed to work at signal to interference noise ratio (SINR)<10 dB). Receiver wireless communication devices (e.g., users) first decode the more robust stream. Those receiver wireless communication devices (e.g., users) with high SNR can decode the second stream by subtracting the first. The power allocation ratio is a system tradeoff that is determined based on the expected signal coverage as defined in terms of the lowest SNR expected to highest SNR expected such that all users can decode the baseline layer and a high percentage of users can decode the second layer and is signaled in the SIG field (e.g., 4 bits denoting a certain range from 3 dB to 15 dB). Note that usage of multiple streams can be used in conjunction with one or more antennas at the transmit and receive sides.

2. Use of stretched quadrature amplitude modulation (QAM) symbols where each quadrant constellation point is shifted away from the origin (0,0) point. A user with lower SNR only decodes the correct quadrant (the 2 most reliable bits of the QAM symbol) that provides the baseline video quality. A user with higher SNR can be able to decode all QAM points. Similarly to the previous method the stretching level is determined by the system depending on the SNR expected.

FIG. 5C is a diagram illustrating an example 503 of adaptive encoding for different transmission streams. In this diagram, a processor of a device (e.g., processor 330 of device 310) is implemented to perform encoding processing using any one or more of different types of FEC codes or ECCs. The processor generates two or more encoded streams based on the various FEC codes or ECCs. In some examples, two or more encoded streams are based on the same FEC code or ECC. In other examples, two or more encoded streams are based on different FEC codes or ECCs. In this example, at or during a first time, the processor generates a first encoded stream based on low density parity check (LDPC) code, and a second encoded stream based on Reed-Solomon (RS) code. Generally, any number of additional encoded streams may be generated based on any one or more FEC codes or ECCs (e.g., up to an n-th encoded stream based on turbo code). Note that these encoded streams subsequently undergo appropriate processing to generate transmission streams for transmission to one or more other devices (e.g., including processing such as that performed by an analog front end (AFE) which may include digital to analog conversion, scaling, frequency shifting, filtering, etc.).

FIG. 5D is a diagram illustrating another example 504 of adaptive encoding for different transmission streams. The operations of this diagram may be viewed as being at or during a different time than the first time of FIG. 5C. Based on one or more considerations, the processor adapts one or more of the FEC codes or ECCs used to generate the two or more encoded streams. For example, based on feedback provided from a recipient device to which the two or more encoded streams of FIG. 5C have been transmitted, the processor selects different one or more FEC codes or ECCs to generate the two or more encoded streams. In this example, at or during a second time, the processor generates the first encoded stream based on BCH (Bose and Ray-Chaudhuri, and Hocquenghem) code. Generally speaking adaptation between different FEC codes or ECCs may be made for the various encoded streams at different times based on different criteria.

FIG. 6A is a diagram illustrating an example 601 of different types of modulations or modulation coding sets (MCSs) used for modulation of different bit or symbol streams. Information, data, etc. may be modulated using various modulation coding techniques. Examples of such modulation coding techniques may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.).

Generally, a device that generates two or more transmission streams based on different parameters can generate a first transmission stream based on a first at least one parameter such as a first MCS that is relatively more robust and provides for relatively lower throughput than a second transmission stream based on a second at least one parameter such as a second MCS that is relatively less robust and provides for relatively higher throughput. Relatively lower-ordered modulation/MCS (e.g., relatively fewer bits per symbol, relatively fewer constellation points per constellation, etc.) may be used for the first transmission stream to ensure reception by a recipient device and so that the recipient device can successfully recover information therein (e.g., being relatively more robust, easier to demodulate, decode, etc.). Relatively higher-ordered modulation/MCS (e.g., relatively more bits per symbol, relatively more constellation points per constellation, etc.) may be used for the second transmission stream so that any recipient device that can successfully recover information there from can use it as well. This second information within the second transmission stream may be separate and independent from first information included within the first transmission stream or may be intended for use in conjunction with the first information included within the first transmission stream.

FIG. 6B is a diagram illustrating an example 602 of different labeling of constellation points in a constellation. This diagram uses an example of a QPSK/QAM shaped constellation having different labeling of the constellation points therein that may be used at different times. In an example operation, a device generates a transmission stream based on the labeling 1 at or during a first time and based on the labeling 2 at or during a second time. The particular labeling of constellation points within a constellation is one example of a parameter that may be used to generate a transmission stream and that may change and vary over time.

FIG. 6C is a diagram illustrating an example 603 of different arrangements of constellation points in a type of constellation. This diagram also uses an example of a QPSK/QAM shaped constellation but with varying placement of the four constellation points based on different forms of QPSK (e.g., QPSK1, QPSK2, and QPSK3). Note that the relative distance of the four constellation points may be scaled differently at different times, yet such that each constellation point is included within a separate quadrant. Comparing QPSK2 to QPSK1, the constellation points of QPSK2 are relatively further from the origin than QPSK1. Comparing QPSK3 to QPSK2, the constellation points of QPSK3 are shifted up or down relative to QPSK2.

Note that any other type of shape of constellation may similarly be varied based on the principles described with respect to FIG. 6B and FIG. 6C. For example, the labeling and or placement of the constellation points within a 8-PSK type constellation, a 16 QAM type constellation, and/or any other type constellation may change in very as a function of time based on any desired consideration as well.

FIG. 6D is a diagram illustrating an example 604 of adaptive symbol mapping/modulation for different transmission streams. In this diagram, a processor of a device (e.g., processor 330 of device 310) is implemented to perform symbol mapping or modulation based on different modulations, symbol mappings, MCSs, etc. at or during different times. In some examples, two or more encoded streams are based on the same modulation, symbol mapping, MCS, etc. In other examples, two or more encoded streams are based on different modulations, symbol mappings, MCSs, etc. In this example, at or during a first time, the processor generates a first symbol stream based on a first QAM/QPSK mode (e.g., QPSK1 of FIG. 6C) and a second symbol stream based on a second QAM/QPSK mode (e.g., QPSK2 of FIG. 6C). Generally, any number of additional symbol streams may be generated based on any one or more modulations, symbol mappings, MCSs, etc. (e.g., up to an n-th symbol stream based on 16 QAM). Note that these symbol streams subsequently undergo appropriate processing to generate transmission streams for transmission to one or more other devices (e.g., including processing such as that performed by an analog front end (AFE) which may include digital to analog conversion, scaling, frequency shifting, filtering, etc.).

FIG. 6E is a diagram illustrating an example 605 of adaptive symbol mapping/modulation for different transmission streams. The operations of this diagram may be viewed as being at or during a different time than the first time of FIG. 6D. Based on one or more considerations, the processor adapts one or more of the modulations, symbol mappings, MCSs, etc. used to generate the two or more symbol streams. For example, based on feedback provided from a recipient device to which the two or more encoded streams of FIG. 6D have been transmitted, the processor selects different one or more modulations, symbol mappings, MCSs, etc. to generate the two or more symbol streams. In this example, at or during a second time, the processor generates the first symbol stream based on 16 QAM, the second symbol stream based on 64 QAM, and optional an n-th symbol stream based on 256 QAM.

FIG. 7A is a diagram illustrating an example 701 of constellation point distribution of a constellation points in a constellation (e.g., with different power allocations). Generally, a 16-QAM modulation includes 16 constellation points, and each constellation point corresponds to a respective 4-bit label or 4-bit symbol (e.g., 0000, 0001, 0010, and so on up to 1111).

FIG. 7B is a diagram illustrating another example 702 of constellation point distribution of a constellation points in a constellation (e.g., with different power allocations). Relative to FIG. 7A, this variant 16 QAM constellation includes constellation points that are extended out relative to the constellation points of FIG. 7A. FIG. 7B depicts constellation points of both 16 QAM shaped constellations (e.g., one having constellation points extended out relative to the other). FIG. 7B has a larger gap requiring much higher SNR to decode all bits but needing lower SNR to decode the un-stretched constellation points.

In a specific example using FIG. 7B, the constellation plot of this diagram shows two examples of stretched 16 QAM where 2 bits are used mapped to the correct quadrant (shown as the hashed constellation points and identified as QPSK1/QAM1) and are relatively more robust then the 2 bits that are used to map to a specific point within the quadrant (shown as the empty constellation points and identified as QPSK2/QAM2). For example, a first transmission stream may include 2 bits symbols that identify the particular quadrant of interest such as being centrally located within a cluster of four other constellation points in each quadrant. This first transmission stream will map each symbol therein to one of the four hashed constellation points that is identified as QPSK1/QAM1. A second transmission stream may also include 2 bits symbols. The second transmission stream will map each symbol therein to one of the four empty constellation points that is identified as QPSK2/QAM2 that are clustered around the identified hashed constellation point that has been identified from the first transmission stream using QPSK1/QAM1.

FIG. 7C is a diagram illustrating an example 703 of different transmission streams associated with different modulations. In this diagram, a first transmission stream includes 2 bits symbols as identified by the hashed constellation points as QPSK1/QAM1 and each symbol of the first transmission stream includes information and also identifies a particular one of the four quadrants. A first transmission stream includes 4 bits symbols as identified by the empty constellation points as 16 QAM that are clustered around each of the four constellation points associated with the first transmission stream.

A recipient device that is able to recover first information from the first transmission stream can use that first information. When the recipient device is able to recover information from the second transmission stream, the device can use that second information as well (e.g., either in for use in conjunction with the first information or separately from the first information).

In a first specific example, the first information included within the first transmission stream corresponds to 480i or 480p resolution video, and the second information included within the second transmission stream corresponds to 1080i or 1080p resolution video. In a second specific example, the first information included within the first transmission stream corresponds to 480i or 480p resolution video, and the second information included within the second transmission stream, when combined with the first information recovered from the first transmission stream, corresponds to 1080i or 1080p resolution video (e.g., the device combines the first information and the second information to recover the 1080i or 1080p resolution video). Note that using different transmission streams to convey video of different resolutions is just one example of use for such hierarchical transmission is described herein. Any of a variety of types of information may be transmitted via the different transmission streams (e.g., any type of media including images, video, audio, etc., any type of data including files, e-mails, text messages, etc., and/or any other type of information that may be transmitted between devices within a communication system).

Note that other types of modulations may be used for different transmission streams or the same type of modulation may be used for different transmission streams. For example, as shown with respect to FIG. 7B, both a first and a second transmission stream use a QPSK type constellation such that symbols of the second transmission stream are mapped around a particular QPSK constellation that is identified by a centrally located constellation point from information recovered from the first transmission stream. Note that any types of combinations of different modulations may be used for the different transmission streams (e.g., example 1: QPSK for the first transmission stream and 8-PSK for the second transmission stream; example 2: 8-PSK for the first transmission stream and QPSK for the second transmission stream; example 3: 16 QAM for the first transmission stream and QPSK for the second transmission stream; etc.).

FIG. 8A is a diagram illustrating another example 801 of different transmission streams associated with different modulations.

FIG. 8B is a diagram illustrating another example 802 of different transmission streams associated with different modulations.

These figures, FIGS. 8A and 8B, show different constellation point distributions of a particular modulation (e.g., with different power allocations). The plots in these diagrams show two specific examples of a 16 QAM modulation and also show the relative magnitudes of the in-phase (I) and quadrature (Q) axes. One of the modulations is stretched 16 QAM (FIG. 8B) where 2 bits are mapped to the quadrant and are more robust and 2 bits mapped to the specific point within the quadrant. FIG. 8A uses lower stretching level leading to smaller gap between the two groups of bits. FIG. 8B has a larger gap requiring much higher SNR to decode all bits but needing lower SNR to decode the un-stretched constellation points. The stretching factor is a system parameter (e.g., one of the parameters by which a device generates transmission streams), similarly to one or more multi-layer transmissions, that may be selected or optimized for one or more specific applications or deployments. Such information may be signaled in a particular field of a packet or frame (e.g., a signal field (SIG) field of an OFDM packet communication).

The current acknowledgement (ACK) needs to be expanded to support feedback of the number of layers received correctly. For example, in a 2 layer hierarchical transmission, a receiver wireless communication device (e.g., wireless station (STA)) may ACK reception of the base layer only or both layers. Based on the feedback, the transmitter can decide whether to use the regular transmission mode or hierarchical transmission mode. For example, wireless communication devices or users that are close to an access point (AP), and those wireless communication devices don't experience large SNR fluctuations may use the regular transmission mode. Users at the cell edge or coverage region edge are more likely to use hierarchical transmission mode.

Referring again to these figures, FIGS. 8A and 8B, FIG. 8A uses lower stretching level leading to smaller gap between the two groups of bits. FIG. 8B has larger gap requiring much higher SNR to decode all bits but needing lower SNR to decode the un-stretched constellation points. Similar to the multi-layer transmission the stretching factor is a system parameter optimized for a specific deployments and signaled in the SIG field.

Determination of Modulation Coding Set (MCS)

Whether a communication system operates using a single MCS single layer transmission scheme or a multi-layer transmission scheme as described herein, the MCS and the multi-layer transmission parameters need to be determined.

At least three novel ways to perform this are presented herein. Any one of these three ways can be used to augment another one of the other three:

1. A-priori knowledge about the deployment (AP density, path loss) can enable prediction of the parameters (collecting location information using location queries or geolocation protocol, such as global positioning system (GPS)). This may correspond to the location of APs and clients (e.g., STAs).

2. Feedback (RSSI, recommended MCS) of unicast (UCAST) transmissions (management frames, ACKs response) may be used. The aggregated power of all APs is predicted/accounted for. For example, the received power for every STA from all APs maybe summed up to predict received power in broadcast mode.

3. Feedback of actual broadcast transmissions may be used. The system could start from more robust parameters and progress based on feedback.

FIG. 8C is a diagram illustrating an embodiment of a method 803 for execution by one or more wireless communication devices. The method 803 begins by generating a first transmission stream by processing first information based on a first at least one parameter (block 810). The method 803 continues by generating a second transmission stream by processing second information based on a second at least one parameter that is relatively less robust than the first at least one parameter (block 820). In one example, the second information augments the first information when combined with the first information. In another example, the first and second information are wholly independent from one another. The method 803 then operates by transmitting, via a communication interface of the wireless communication device, the first transmission stream and the second transmission stream to at least one other wireless communication device (block 830).

FIG. 8D is a diagram illustrating another embodiment of a method 804 for execution by one or more wireless communication devices. The method 804 begins by generating a first transmission stream corresponding to 480p video (block 811). The method 804 continues by generating a second transmission stream corresponding to 1080i video (block 821). In some examples, the second transmission stream, when combined with the first transmission stream, corresponds to 1080i video. The method 804 then operates by transmitting, via a communication interface of the wireless communication device, the first transmission stream and the second transmission stream to at least one other wireless communication device (block 831).

FIG. 9 is a diagram illustrating another embodiment of a method 900 for execution by one or more wireless communication devices. The method 900 begins by receiving a first transmission stream from another wireless communication device, wherein the first transmission stream includes first information that is based on a first at least one parameter (block 910). The method 900 continues by receiving a second transmission stream from the other wireless communication device (block 920). In one example, the second transmission stream includes second information that is based on a second at least one parameter. In another example, the first and second transmission streams are independent from one another.

The method 900 then operates by processing the first transmission stream to extract the first information there from (block 930). The method 900 continues by processing the second transmission stream to determine whether the second information may be successfully extracted from the second transmission stream (block 940). When it is determined that the second information may be successfully extracted from the second transmission stream (block 950), the method 900 continues by processing the second transmission stream to extract the first information there from and generate a first output signal based on both the first information and the second information (block 960).

Alternatively, when it is determined that the second information cannot be successfully extracted from the second transmission stream (block 950), the method 900 then operates by generating a second output signal based on only the first information (block 970).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor, the processor and the communication interface configured to:
generate a first transmission stream by processing first information based on a first at least one parameter;
generate a second transmission stream by processing second information that is different than the first information and that is based on a second at least one parameter that is relatively less robust than the first at least one parameter, wherein the second information augments the first information when combined with the first information; and
transmit the first transmission stream based on a first symbol stream and the second transmission stream based on a second symbol stream that is different than the first symbol stream to at least one other wireless communication device, wherein the first at least one parameter specifies first modulation of the first transmission stream, and the second at least one parameter specifies second modulation of the second transmission stream such that the first transmission stream is less affected by at least one of noise or interference than the second transmission stream during transmission from the wireless communication device to the at least one other wireless communication device, wherein a first symbol based on the first modulation of the first transmission stream specifies a quadrant of four quadrants based on a first constellation origin of the first modulation, and wherein a second symbol based on the second modulation of the second transmission stream is based on a second constellation origin of the second modulation at a location of the first symbol based on the first modulation of the first transmission stream.

2. The wireless communication device of claim 1, wherein:
the first at least one parameter includes at least one of:
a first forward error correction (FEC) code;
a first error correction code (ECC);
a first modulation coding set (MCS);
a first modulation type including a first mapping of a first plurality of constellation points arranged in a first constellation;
a first power;
a first orthogonal frequency division multiplexing (OFDM) configuration; or
a first multiple-input-multiple-output (MIMO) configuration; and
the second at least one parameter includes at least one of:
a second FEC code;
a second ECC;
a second MCS;
a second modulation type including a second mapping of a second plurality of constellation points arranged in a second constellation;
a second power;
a second OFDM configuration; or
a second MIMO configuration.

3. The wireless communication device of claim 2, wherein:
the second FEC code is relatively less robust and has relatively higher code rate than the first FEC;
the second ECC is relatively less robust and has relatively higher code rate than the first ECC;
the second MCS is relatively less robust and provides for relatively higher throughput than the first MCS;
the second plurality of constellation points includes more constellation points than the first plurality of constellation points; and
the second power is relatively lower than the first power.

4. The wireless communication device of claim 1, wherein the processor and the communication interface are further configured to:
generate the first transmission stream to include a first plurality of symbols each having a first number of bits; and
generate the second transmission stream to include a second plurality of symbols each having a second number of bits that is greater than the first number of bits.

5. The wireless communication device of claim 1, wherein the processor and the communication interface are further configured to:
generate the first transmission stream by processing first video information based on the first at least one parameter, wherein the first transmission stream corresponds to a video stream having a first resolution; and
generate the second transmission stream by processing second video information based on the second at least one parameter that is relatively less robust than the first at least one parameter, wherein the first transmission stream in combination with the second transmission stream corresponds to other information of the video stream having a second resolution that is higher than the first resolution.

6. The wireless communication device of claim 1, wherein the processor and the communication interface are further configured to:
select the first at least one parameter based on a first signal to noise ratio (SNR) corresponding to a first communication pathway; and
select the second at least one parameter based on a second SNR corresponding to a second communication pathway, wherein the second SNR is relatively higher than the first SNR.

7. The wireless communication device of claim 1 further comprising:
an access point (AP), wherein the other wireless communication device is a wireless station (STA).

8. The wireless communication device of claim 1 further comprising:
a wireless station (STA), wherein the other wireless communication device is an access point (AP).

9. A wireless communication device comprising:
a communication interface; and
a processor, the processor and communication interface configured to:
receive a first transmission stream based on a first symbol stream from another wireless communication device, wherein the first transmission stream includes first information that is based on a first at least one parameter;
receive a second transmission stream based on a second symbol stream that is different than the first symbol stream from the another wireless communication device, wherein the second transmission stream includes second information that is different than the first information and that is based on a second at least one parameter, wherein the first at least one parameter specifies first modulation of the first transmission stream, and the second at least one parameter specifies second modulation of the second transmission stream such that the first transmission stream is less affected by at least one of noise or interference than the second transmission stream during transmission from the another wireless communication device to the wireless communication device, wherein a first symbol based on the first modulation of the first transmission stream specifies a quadrant of four quadrants based on a first constellation origin of the first modulation, and wherein a second symbol based on the second modulation of the second transmission stream is based on a second constellation origin of the second modulation at a location of the first symbol based on the first modulation of the first transmission stream;

process the first transmission stream to extract the first information therefrom;

process the second transmission stream to determine whether the second information may be successfully extracted from the second transmission stream;

process the second transmission stream to extract the first information therefrom and generate a first output signal based on both the first information and the second information when it is determined that the second information may be successfully extracted from the second transmission stream; and generate a second output signal based on only the first information when it is determined that the second information cannot be successfully extracted from the second transmission stream.

10. The wireless communication device of claim 9, wherein:
the first at least one parameter includes at least one of:
a first forward error correction (FEC) code;
a first error correction code (ECC);
a first modulation coding set (MCS);
a first modulation type including a first mapping of a first plurality of constellation points arranged in a first constellation;
a first power;
a first orthogonal frequency division multiplexing (OFDM) configuration; or
a first multiple-input-multiple-output (MIMO) configuration; and
the second at least one parameter includes at least one of:
a second FEC code;
a second ECC;
a second MCS;
a second modulation type including a second mapping of a second plurality of constellation points arranged in a second constellation;
a second power;
a second OFDM configuration; or
a second MIMO configuration.

11. The wireless communication device of claim 10, wherein:
the second FEC code is relatively less robust and has relatively higher code rate than the first FEC;
the second ECC is relatively less robust and has relatively higher code rate than the first ECC;
the second MCS is relatively less robust and provides for relatively higher throughput than the first MCS;
the second plurality of constellation points includes more constellation points than the first plurality of constellation points; and
the second power is relatively lower than the first power.

12. The wireless communication device of claim 9, wherein the processor and the communication interface are further configured to:
process the second transmission stream to extract the first information therefrom and generate a first output video signal having a first resolution based on both the first information and the second information when it is determined that the second information may be successfully extracted from the second transmission stream; and
generate a second output video signal having a second resolution that is lower than the first resolution based on only the first information when it is determined that the second information cannot be successfully extracted from the second transmission stream.

13. The wireless communication device of claim 9 further comprising:
a wireless station (STA), wherein the another wireless communication device is an access point (AP).

14. A method for execution by a wireless communication device, the method comprising:
generating a first transmission stream by processing first information based on a first at least one parameter;
generating a second transmission stream by processing second information that is different than the first information and that is based on a second at least one parameter that is relatively less robust than the first at least one parameter, wherein the second information augments the first information when combined with the first information; and
transmitting, via a communication interface of the wireless communication device, the first transmission stream based on a first symbol stream and the second transmission stream based on a second symbol stream that is different than the first symbol stream to at least one other wireless communication device, wherein the first at least one parameter specifies first modulation of the first transmission stream, and the second at least one parameter specifies second modulation of the second transmission stream such that the first transmission stream is less affected by at least one of noise or interference than the second transmission stream during transmission from the wireless communication device to the at least one other wireless communication device, wherein a first symbol based on the first modulation of the first transmission stream specifies a quadrant of four quadrants based on a first constellation origin of the first modulation, and wherein a second symbol based on the second modulation of the second transmission stream is based on a second constellation origin of the second modulation at a location of the first symbol based on the first modulation of the first transmission stream.

15. The method of claim 14, wherein:
the first at least one parameter includes at least one of:
a first forward error correction (FEC) code;
a first error correction code (ECC);
a first modulation coding set (MCS);
a first modulation type including a first mapping of a first plurality of constellation points arranged in a first constellation;
a first power;

a first orthogonal frequency division multiplexing (OFDM) configuration; or
a first multiple-input-multiple-output (MIMO) configuration; and the second at least one parameter includes at least one of:
a second FEC code;
a second ECC;
a second MCS;
a second modulation type including a second mapping of a second plurality of constellation points arranged in a second constellation;
a second power;
a second OFDM configuration; or
a second MIMO configuration.

16. The method of claim 15, wherein:
the second FEC code is relatively less robust and has relatively higher code rate than the first FEC;
the second ECC is relatively less robust and has relatively higher code rate than the first ECC;
the second MCS is relatively less robust and provides for relatively higher throughput than the first MCS;
the second plurality of constellation points includes more constellation points than the first plurality of constellation points; and
the second power is relatively lower than the first power.

17. The method of claim 14 further comprising:
generating the first transmission stream to include a first plurality of symbols each having a first number of bits; and
generating the second transmission stream to include a second plurality of symbols each having a second number of bits that is greater than the first number of bits.

18. The method of claim 14 further comprising:
generating the first transmission stream by processing first video information based on the first at least one parameter, wherein the first transmission stream corresponds to a video stream having a first resolution; and
generating the second transmission stream by processing second video information based on the second at least one parameter that is relatively less robust than the first at least one parameter, wherein the first transmission stream in combination with the second transmission stream corresponds to other information of the video stream having a second resolution that is higher than the first resolution.

19. The method of claim 14 further comprising:
selecting the first at least one parameter based on a first signal to noise ratio (SNR) corresponding to a first communication pathway; and
selecting the second at least one parameter based on a second SNR corresponding to a second communication pathway, wherein the second SNR is relatively higher than the first SNR.

20. The method of claim 14, wherein the wireless communication device is an access point (AP), and the other wireless communication device includes a wireless station (STA).

* * * * *